(12) United States Patent
Thakur et al.

(10) Patent No.: US 11,322,849 B2
(45) Date of Patent: May 3, 2022

(54) SLOT ANTENNAS FOR ELECTRONIC USER DEVICES AND RELATED METHODS

(71) Applicant: Intel Corporation, Santa Clara, CA (US)

(72) Inventors: Jayprakash Thakur, Bangalore (IN); Prakash Kurma Raju, Bangalore (IN); Gustavo Fricke, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/716,919

(22) Filed: Dec. 17, 2019

(65) Prior Publication Data

US 2020/0127384 A1 Apr. 23, 2020

(51) Int. Cl.
| | |
|---|---|
| *H01Q 1/00* | (2006.01) |
| *H01Q 13/10* | (2006.01) |
| *H01Q 1/44* | (2006.01) |
| *H01Q 5/00* | (2015.01) |
| *H01Q 1/22* | (2006.01) |
| *H01Q 21/06* | (2006.01) |
| *G06F 1/16* | (2006.01) |
| *H01Q 13/16* | (2006.01) |
| *H01Q 1/24* | (2006.01) |
| *H01Q 5/15* | (2015.01) |

(52) U.S. Cl.
CPC ........... *H01Q 13/10* (2013.01); *H01Q 1/2266* (2013.01); *H01Q 1/44* (2013.01); *H01Q 5/00* (2013.01); *H01Q 21/064* (2013.01); *G06F 1/1616* (2013.01); *G06F 1/1662* (2013.01); *H01Q 1/243* (2013.01); *H01Q 5/15* (2015.01); *H01Q 13/16* (2013.01)

(58) Field of Classification Search
CPC .......... H01Q 13/10; H01Q 1/22; H01Q 1/243; H01Q 5/15; H01Q 13/16; H01Q 13/106; H01Q 13/103; H01Q 1/48
USPC ........ 343/720, 702, 750, 727, 746, 770, 908
See application file for complete search history.

(56) References Cited

U.S. PATENT DOCUMENTS

| | | | | |
|---|---|---|---|---|
| 5,760,745 A | * | 6/1998 | Endo | ...................... H01Q 1/243 343/702 |
| 8,111,204 B2 | | 2/2012 | Croman | |

(Continued)

OTHER PUBLICATIONS

Choubey et al., "Parallel Slot Loaded Proximity Coupled Microstrip Antenna For Wireless Communication Application," International Journal of Engineering Sciences & Emerging Technologies, Apr. 2012, vol. 2, Issue 1, pp. 37-45, 9 pages.

(Continued)

*Primary Examiner* — Joseph J Lauture
(74) *Attorney, Agent, or Firm* — Hanley, Flight & Zimmerman, LLC

(57) ABSTRACT

Example slot antennas for electronic user device and related methods are disclosed herein. An example electronic user device including at least one of a lid or a base. The at least one of the lid or the base have a first surface and a second surface spaced apart from the second surface. The example electronic user device includes an antenna including a first aperture in the first surface and a second aperture in the second surface. The example user device includes a first cover at least partially disposed in the first aperture and a second cover at least partially disposed in the second aperture.

19 Claims, 10 Drawing Sheets

(56) References Cited

U.S. PATENT DOCUMENTS

| | | | |
|---|---|---|---|
| 2005/0007279 A1* | 1/2005 | Chang | H01Q 1/243 |
| | | | 343/700 MS |
| 2007/0080864 A1 | 4/2007 | Channabasappa | |
| 2012/0319914 A1* | 12/2012 | Sakuma | H01Q 9/22 |
| | | | 343/790 |
| 2016/0135321 A1* | 5/2016 | Korikawa | H05K 5/0021 |
| | | | 361/724 |
| 2018/0342794 A1* | 11/2018 | Han | H01Q 5/328 |

OTHER PUBLICATIONS

Chulvanich et al., "Design Narrow Slot Antenna for Dual Frequency," Piers Online, vol. 3, No. 7, 2007, pp. 1024-1028, 5 pages.

Jackson, "HP Spectre x360 Review: A Ghost of a Chance Against Apple," retrieved on Nov. 11, 2019, from, http://www.notebookreview.com/notebookreview/hp-spectre-x360-review-ghost-chance-apple/, 7 pages.

Sastry et al., "Proximity Coupled Rectangular Microstrip Antenna with X-slot for WLAN Application," Global Journal of Researches in Engineering: F: Electrical and Electronics Engineering, vol. 14, Issue 1, Version 1.0, 2014, pp. 15-18, 5 pages.

Yassen et al.,"A New Compact Slot Antenna for Dual-band WLAN Applications," International Journal of Science and Modern Engineering (IJISME), vol. 1, Issue 10, Sep. 2013, pp. 28-32, 5 pages.

Lee et al., "Low-Cost, Direct-Fed Slot Antenna Built in Metal Cover of Notebook Computer for 2.4-/5.2-/5.8-GHz WLAN Operation", IEEE Transaction On Antennas and Propogation, vol. 65, No. 5, May 2017, pp. 2677-2682.

\* cited by examiner

SLOT ANTENNAS FOR ELECTRONIC USER DEVICES AND RELATED METHODS

FIELD OF THE DISCLOSURE

This disclosure relates generally to electronic user devices and, more particularly, to slot antennas for electronic user devices and related methods.

BACKGROUND

A slot antenna can be formed from a conductive surface (e.g., a metal surface) defining an aperture or a slot therein. The slot antenna is excited by applying a voltage across the slot. The slot antenna radiates electromagnetic waves in response to the excitation. The slot antenna can be fed by a metal strip disposed near the slot via proximity coupling (e.g., capacitive coupling). The slot antenna can act as a receiver of electromagnetic waves, which can be converted to electrical signals for processing.

An electronic user device such as a laptop can include one or more antennas to enable the device to communicate via wireless communication protocols via transmission and/or receipt of electromagnetic waves.

BRIEF DESCRIPTION OF THE DRAWINGS

The figures are not to scale. Instead, the thickness and/or width of the structures, layers, or regions may be enlarged in the drawings. In general, the same reference numbers will be used throughout the drawing(s) and accompanying written description to refer to the same or like parts.

Figure 1:
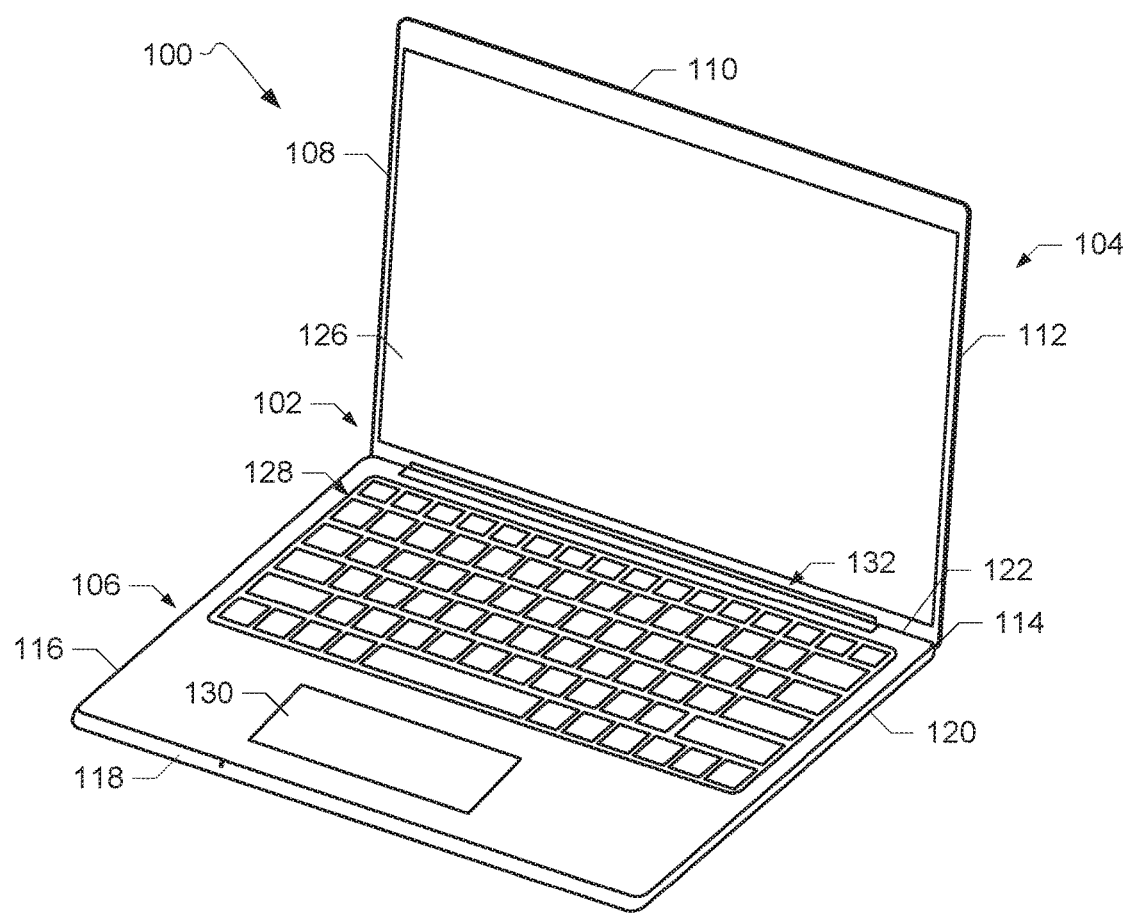
FIG. 1 illustrates an example electronic user device in an open position and constructed in accordance with teachings of this disclosure.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

A slot antenna can be formed from a conductive surface in a structure and/or from a conductor such as a metal surface by defining an aperture or a slot therein. The slot antenna can radiate electromagnetic waves in response to excitation by a voltage source. The slot antenna can be fed electromagnetic signals by a metal strip disposed near the slot based on proximity coupling (e.g., capacitive coupling) and/or by an RF (radio frequency) cable having ends coupled to the sides of the slots. In addition to transmitting waves, the slot antenna can act as a receiver by being excited by electromagnetic signals.

An electronic user device such as a laptop or tablet can include one or more antennas to enable the device to communicate wirelessly by transmitting and receiving electromagnetic waves. Some known user devices include a metal chassis (e.g., housing) that provides for improved durability of the chassis and thermal control of hardware components of the device as compared to other materials such as plastic. A metal chassis can also contribute to an aesthetic design of the device. However, the metal chassis can interfere with the performance of an antenna disposed in the chassis. In particular, signals transmitted or received by the antenna can be absorbed by the conductive metal material of the chassis.

To reduce interference between a slot antenna and a metal chassis of a user device, some known devices position the slot antenna proximate to a display screen of the device. The display screen typically includes a bezel made of a non-conductive material (e.g., plastic). In such known devices, a slot is formed in a metal lid that serves as a back cover of the display screen. The slot is formed proximate to an edge of the metal lid such that a portion of the non-conductive bezel is opposite the location where the slot is formed in the lid. Thus, the bezel covers the slot. However, in such known examples, a width of the display screen bezel may be excessively increased to cover the slot. Further, in such known devices, the location of the slot antenna is restricted to positions along the edges of the lid that correspond to areas covered by the bezel on the opposite side of the lid. Additionally, forming the slot in the back of the metal lid can disrupt the appearance of the chassis design and affect the aesthetics of the device.

Other known devices include a slot antenna formed in a base of the user device (e.g., a base of the laptop). However, such known devices use non-conductive materials for at least a portion of the base to prevent adverse effects of metal on the performance of the antenna. For example, some known devices include a slot antenna formed in a bottom metal surface of a base of the device (e.g., a surface of the base that rests on table). In such known devices, a portion of the base opposite the surface in which the slot is formed can include a plastic material. For instance, the portion of the base surrounding a keyboard of laptop may be plastic. Thus, although some known devices include slot antennas in a base of the device, the inclusion of non-conductive materials prevents use of an all-metal or substantially all-metal chassis.

Disclosed herein are example user devices including one or more slot antennas formed in a metal chassis of the device. Example user devices disclosed herein include paired slot antennas having a first slot formed in a first surface of the metal chassis and a second slot formed in a second surface of the metal chassis. A metal strip is placed proximate to one of the slots to serve as an antenna feed to excite the slot antenna for transmission to cause the antenna to transmit electromagnetic waves via proximity coupling (e.g., capacitive coupling). In example paired slot antennas disclosed herein, the second slot acts a mirrored antenna, where the magnetic fields that generate excitation of the antenna are passed across the slots. Example slot antennas disclosed herein also act as receivers that are excited by electromagnetic waves received from transmitter(s). Example slot antennas disclosed herein can be resonant at, for instance, 2.4 GHz and 5 GHz frequency bands and, thus, provide for dual-band wireless communication using, for example, Wi-Fi. Example slot antennas disclosed herein can be communicatively coupled to radio frequency (RF) circuitry of the user device to enable wireless communication. Thus, example slot antennas disclosed herein permit a metal chassis to be used for the user device without requiring portions of the chassis to be replaced with a non-conductive material to enable transmission and/or receipt of wireless signals via the antennas.

In examples disclosed herein, the respective slots of the slot antenna are covered with a non-conductive material such as rubber. For instance, a first slot of a slot antenna can be in a surface of a metal base of the device (e.g., a base that rests on, for instance, a table) and a second slot of the slot antenna can be in a surface of the base that surrounds a keyboard of the device. In such examples, the non-conductive material used to cover the first slot in the table-facing surface of the metal base can serve as a foot to support the device, prevent the device from directly resting on the table, prevent the device from slipping, etc. The non-conductive material that covers the second slot in the keyboard-facing surface of the metal base can serve as a bumper to maintain a gap between the base and a lid of the device when the lid is rotated toward the base (e.g., in the case where the device is a portable device such as a laptop with a clamshell configuration, to close the laptop). In other example user devices disclosed herein, slot antennas are in a metal frame of a device having a foldable display screen. In such examples, a first slot of the slot antenna that is located on a side of the device including the display screen can be covered by a bezel and a second slot of the antenna that is located on a side of the device opposite the side with the display screen can be covered by a back cover.

In some examples disclosed herein, the metal strip, wire, or other circuitry that communicates with the antenna is supported by the non-conductive material covering one of the slots. For example, the metal strip can be supported by the non-conductive material via an overmolding process. In such examples, the non-conductive material can perform multiple functions in addition to covering the slots of the slot antenna such as serving as feet of the device and housing the communication circuitry.

FIG. 1 illustrates an example user device 100 constructed in accordance with teachings of this disclosure. The example user device 100 of FIG. 1 is a laptop. However, the user device 100 can be implemented in other form factors such as tablets, smartphones, etc.

The example user device 100 of FIG. 1 includes a chassis or housing 102 including a lid 104 and a base 106 pivotably coupled in a clamshell configuration. The example lid 104 of FIG. 1 includes a first lid edge 108, a second lid edge 110, a third lid edge 112, and a fourth lid edge 114. The example base 106 of FIG. 1 includes a first base edge 116, a second base edge 118, a third base edge 120, and a fourth base edge 122. In the example of FIG. 1, the housing 102 including the lid 104 and the base 106 is formed from a metal material such as aluminum.

Figure 2:
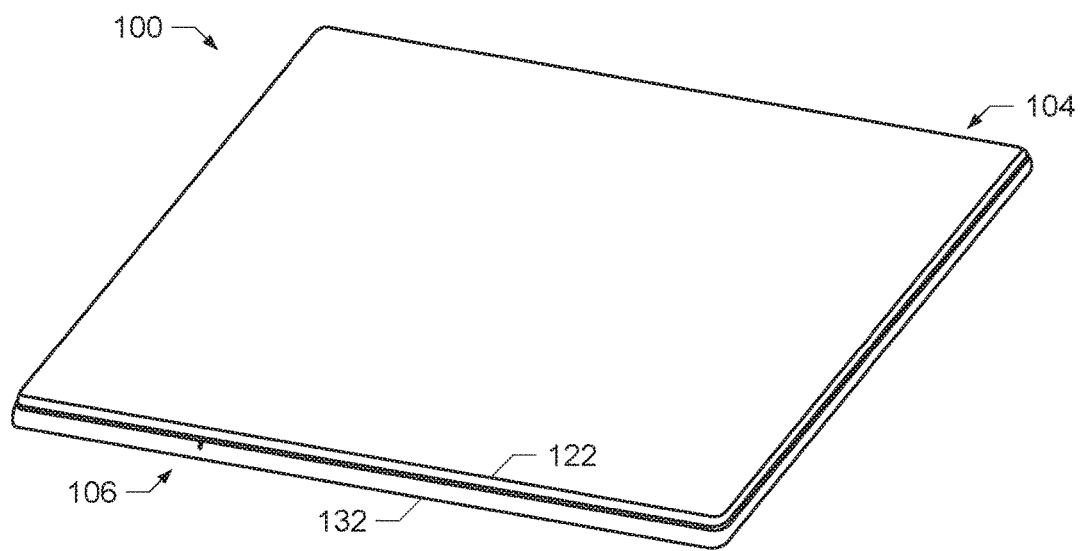
FIG. 2 illustrates the example electronic user device of FIG. 1 in a closed position.

The lid 104 of the example user device 100 of FIG. 1 supports a display screen 126. The base 106 of the example user device 100 supports a keyboard 128 and a touch pad 130. In the example of FIG. 1, the user device 100 is in an open position, where the second lid edge 110 of the lid 104 is spaced apart from second base edge 118 of the base 106 and the display screen 126 is visible. The lid 104 of this example can rotate about a hinge 132 of the user device 100 to enable the device 100 to move between the open position shown in FIG. 1 and a closed position. FIG. 2 illustrates the example user device 100 of FIG. 1 in the closed position in which the lid 104 has been rotated about the hinge 132 (FIG. 1) such that the second lid edge 110 of the lid 104 is substantially adjacent to the second base edge 118 of the base 106.

The example user device 100 of FIGS. 1 and 2 can communicate wirelessly via on or more wireless communication protocols (e.g., Wi-Fi, Bluetooth®, etc.). In particular, the example user device 100 includes one or more antennas that transmit and receive wireless signals. The user device 100 includes circuitry to modulate data into signals for transmission via the antenna(s) and/or to convert RF signals obtained via the antenna to data. In this example, the user device 100 includes RF circuitry to enable the user device 100 to send and/or receive signals over frequency bands of, for example, 2.4 GHz and 5 GHz, in a wireless communication network, such as a wireless local area network (WLAN).

Figure 3A:
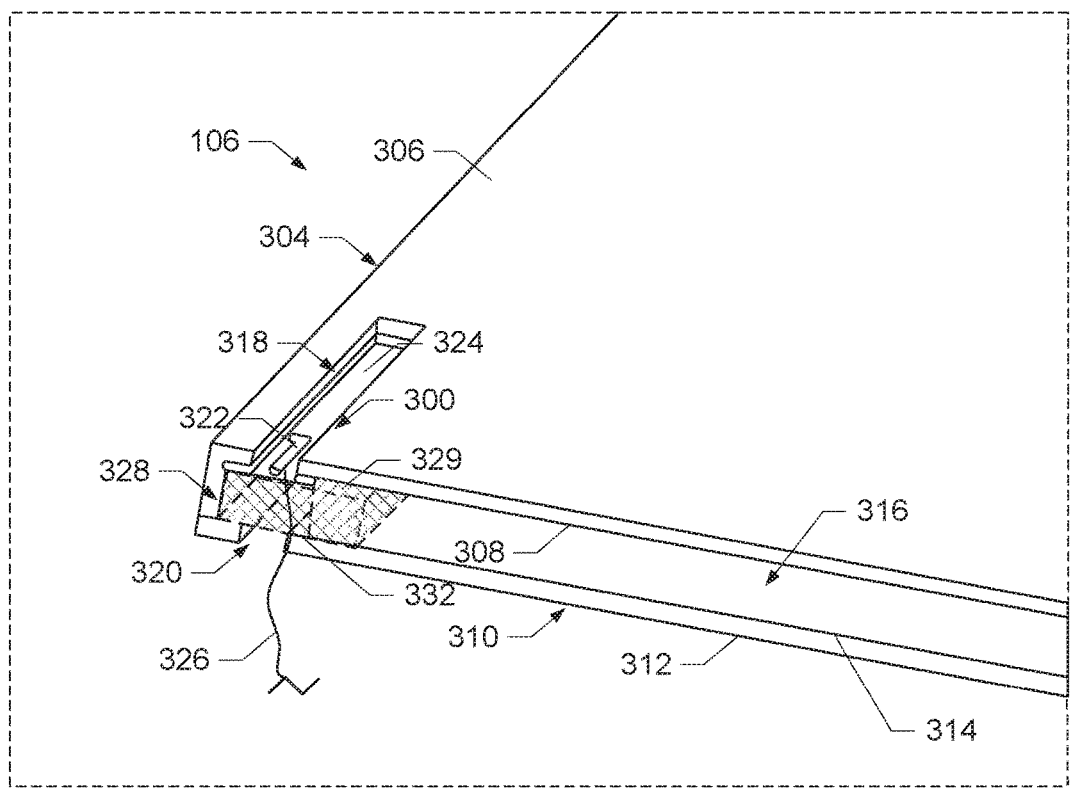
FIG. 3A is a cutaway view of a base of the example user device of FIG. 1 including an example slot antenna constructed in accordance with teachings of this disclosure.

FIG. 3A illustrates an example slot antenna 300 in the example user device 100 of FIG. 1 to enable transmission and/or receipt of wireless signals. The example slot antenna 300 of FIG. 3A is formed in the metal base 106 of the example user device 100 of FIG. 1. The metal base 106 defines a metal housing made of, for instance, aluminum. For illustrative purposes, FIG. 3A shows a cutaway view of the base 106.

The base 106 includes a first surface 304 having a first side 306 and a second side 308 opposite the first side 306. The base 106 includes a second surface 310 spaced apart from and opposite the first surface 304. The second surface 310 includes a first side 312 and a second side 314. In the example of FIG. 3A, a cavity 316 is defined in the metal base 106 between the first and second surfaces 304, 310.

The example slot antenna 300 of FIG. 3A includes a first aperture or slot 318 defined in the first metal surface 304 and a second aperture or slot 320 defined in the second metal surface 310. In the example of FIG. 3A, the first slot 318 is opposite and aligned with the second slot 320. Thus, the first slot 318 and the second slot 320 are a pair. The first slot 318 and the second slot 320 are substantially the same size and shape such that the second slot 320 mirrors the first slot 318. The sizes and/or shapes of the slots 318, 320 can be any desired size and/or shape. For example, each of the first and second slots 318, 320 of this example has a length of 50 millimeters (mm) and a width of 2.5 mm. The size and/or shape of the first slot 318 and/or the second slot 320 can differ from the examples shown in FIG. 3A. The length and/or the width of the slots 318, 320 can be selected to control a resonant frequency and, thus, bandwidth of the slot antenna 300. The length can be, for instance, half of a wavelength of a signal that the slot antenna 300 is to radiate or receive to enable the slot antenna 300 to be resonant at the frequency of the signal. The slots 318, 320 can be formed in the metal surface via, for example, extrusion, cutting, and/or by any other manufacturing method.

The example base 106 of FIG. 3A includes means for communicating signals to/from the slot antenna 300. In the example of FIG. 3A, the communicating means includes a conductor or a metal strip 322. The metal strip 322 can include copper and/or another conductive material. The metal strip 322 can have any desired dimensions such as, for example, a length of 12 mm and a width of 0.5 mm. In the example of FIG. 3A, the metal strip 322 is supported by a support 324. The support 324 can include a printed circuit board (e.g., made of FR-4 material), a flexible printed circuit, a metal sheet, etc. In the example shown in FIG. 3A, the support 324 is coupled to the second side 308 of the first surface 304 of the base 106 such that the metal strip 322 faces the first slot 318. In other examples, the support 324 is coupled to the second side 314 of the second surface 310 of the metal base 106 such that the metal strip 322 faces the second slot 320. The support 324 can be coupled to the first metal surface 304 and/or the second metal surface 310 via mechanical fastener(s) and/or chemical fastener(s). In other examples, the support 324 is additionally or alternatively at least partially coupled to a non-conductive material that covers the first slot 318 or the second slot 320 (e.g., via a press fit), as disclosed herein.

When the example slot antenna 300 of FIG. 3A is implemented in a user device such as the user device 100 of FIG. 1, the metal strip 322 can be coupled to, for example, an RF cable 326 that communicatively couples the slot antenna 300 to RF circuitry such as a transceiver and/or to a wireless controller of the user device 100. As such, the metal strip 322 provides signals to excite the first slot 318 to radiate electromagnetic waves (e.g., RF signals) via proximity coupling (e.g., capacitive coupling) between the metal strip 322 and the first surface 304 of the metal base 106. The metal strip 322 can also convey signals received by the slot antenna 300 away from the slot antenna 300 for processing by the RF circuitry of the device 100. In the example of FIG. 3A, the second slot 320 acts as a mirrored antenna and the magnetic field generated at the first slot 318 passes between the slots 318, 320. The example slot antenna 300 of FIG. 3A formed from the first slot 318 and the second slot 320 can be resonant at 2.4 GHz and 5 GHz frequency bands.

In some examples, component(s) of the user device 100 of FIG. 1 that are made of non-conductive material(s), such as a speaker 328 can be disposed in the cavity 316 between (e.g., aligned with) the first slot 318 and the second slot 320 of the example slot antenna 300. Because such component(s) (e.g., the speaker 328) are made of a non-conductive material, the speaker 328 does not interfere with the electromagnetic fields generated by the slot antenna 300 during transmission and/or receipt of wireless signals. Thus, in the example of FIG. 3A, the space within the cavity 316 is used effectively by the placement of the speaker 328 between the slots 318, 320 of the slot antenna 300 because extra space does not need to be reserved in the cavity 316 for the slot antenna 300.

In some examples, instead of coupling the support 324 including the metal strip 322 to the second side 308 of the first surface 304 and/or to a non-conductive material that forms a cover for the first slot 318, the support 324 including the metal strip 322 is coupled to a surface 329 of speaker 328 opposite the first slot 318. The support 324 is coupled to the surface 330 of the speaker 328 to position the metal strip 322 proximate to the first slot 318 of the slot antenna 300. The support 324 can be coupled to the surface 330 of the speaker 328 via mechanical fastener(s) and/or chemical fastener(s). In other examples, the support 324 including the metal strip 322 is coupled to a surface 332 of the speaker 328 opposite the surface 329 to position the metal strip 322 proximate to the second slot 320 of the slot antenna 300.

Figure 3B:
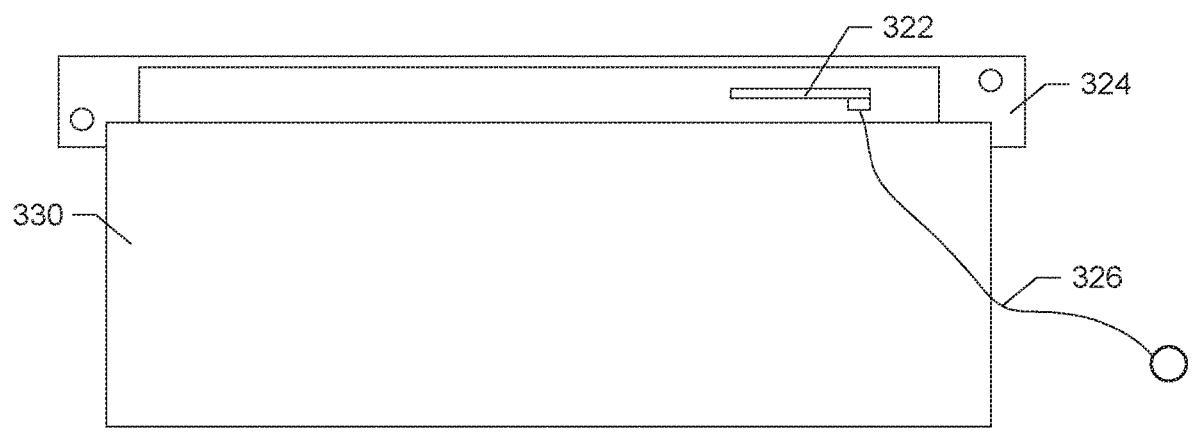
FIG. 3B illustrates an example metal strip for communicating signals that can be implemented with the example slot antenna of FIG. 3A.

FIG. 3B is a top view of the example metal strip 322 and the support 324 of FIG. 3A. For illustrative purposes, the metal base 106 and the slot antenna 300 formed therein are not shown in FIG. 3B.

As shown in FIG. 3B, the metal strip 322 is supported by the support 324 which, in this example, includes a flexible printed circuit board. As disclosed herein, in some examples, the support 324 is at least partially coupled to a non-conductive material that forms a cover for the slot via, for instance, a press fit. In some examples, the support 324 is additionally or alternatively coupled to the metal housing 106. For example, in some instances, at least a portion of the support 324 surrounding the metal strip 322 includes metal. In such examples, the support 324 is coupled to the metal base 106 to provide for grounding. For example, a metal sheet 330 can be coupled to the support 324 (e.g., via mechanical and/or chemical fasteners). The metal sheet 330 can be coupled to the first metal surface 304 (FIG. 3A) or the second metal surface 310 (FIG. 3A) of the metal base 106 (e.g., based on the positioning of the metal strip 318 proximate to the first slot 318 or the second slot 320 of FIG. 3A) to provide for grounding. The example metal sheet 330 can have different shapes and/or sizes and/or be can be coupled to the support 324 at different locations than shown in FIG. 3B. The example support 324 can include additional metal sheets 330 coupled thereto to provide for coupling of the support 324 to the metal base 106.

As shown in FIG. 3B, the cable 326 is coupled to the metal strip 322. The cable 326 enables the metal strip 322 to communicate signals to/from the slot antenna 300 to the RF circuitry of the device 100.

Figure 4:
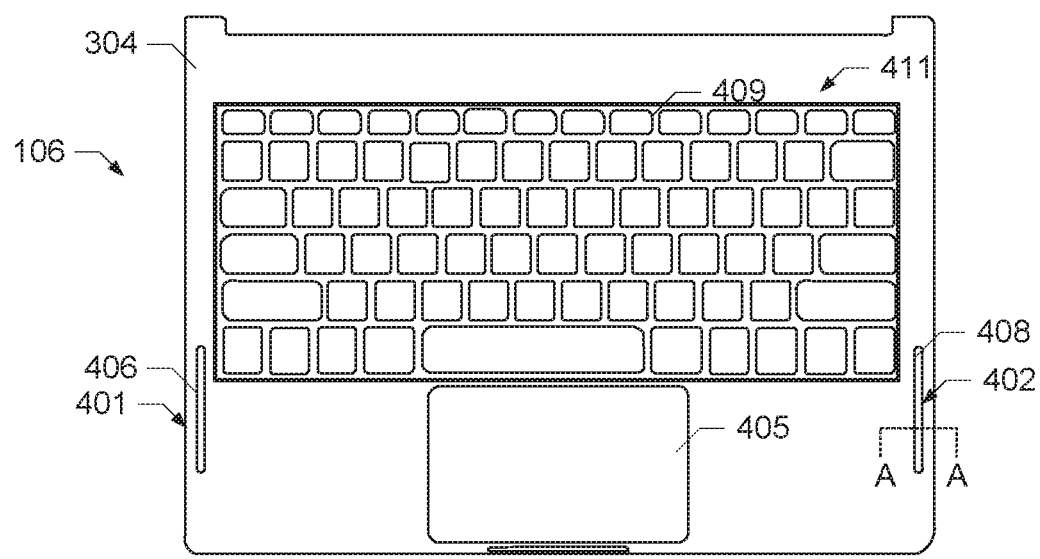
FIG. 4 is a top view of the base of the example user device of FIG. 1 including example slot antennas constructed in accordance with teachings disclosed herein.

FIG. 4 illustrates a top view of the metal base 106 of the example user device 100 of FIG. 1 including alternative example slot antennas to the example slot antenna 300 of FIG. 3A. The base 106 of FIG. 4 includes a first slot antenna 401 and a second slot antenna 402. The first and second slot antennas 401, 402 include respective slots defined in the first surface 304 of the base 106 substantially as disclosed in connection with the first slot 318 of the example slot antenna 300 of FIG. 3A. The size and/or locations of the first slot antenna 401 and/or the second slot antenna 402 can differ from the examples shown in FIG. 4. For example, the slot antenna(s) 401, 402 can be positioned proximate to a touch pad 405, proximate to an upper edge 409 of a keyboard 411, etc. The base 106 can include additional or fewer slot antennas than shown in FIG. 4.

In the example of FIG. 4, the first slot antenna 401 in the first surface 304 of the base 106 is covered by a first cover 406. The second slot antenna 402 in the first surface 304 of the base 106 is covered by a second cover 408. The example base 106 can include additional covers based on the number of slot antennas in the base 106.

The covers 406, 408 prevent debris from entering the slots of the slot antennas 401, 402. In the example of FIG. 4, the covers 406, 408 include a non-conductive material such as a plastic, rubber, ceramic, etc. For instance, the covers 406, 408 can include thermoplastic urethane (TPU). The non-conductive material of the covers 406, 408 of FIG. 4 permits electromagnetic waves to enter and/or leave the corresponding slot antennas 401, 402 without interfering with the transmission and/or receipt of those signals by the slot antennas 401, 402.

The example covers 406, 408 of FIG. 4 are rib-shaped. However, other shapes and/or sizes of the respective covers 406, 408 can be used to cover the slots of the slot antennas 401, 402 based on, for example, the size of the slots of the slot antennas 401, 402 in the first surface 304 of the base 106. The example covers 406, 408 can be coupled to the first surface 304 of the base 106 via mechanical fastener(s) and/or chemical fastener(s). In some examples, a length of the respective covers 406, 408 may be longer than a length of the slots of the slot antennas 401, 402 in the first surface 304 to cover the slots. In other examples, the covers 406, 408 are at least partially disposed in the slots and held in place via an interference fit as disclosed below in FIGS. 6 and 7.

Figure 5:
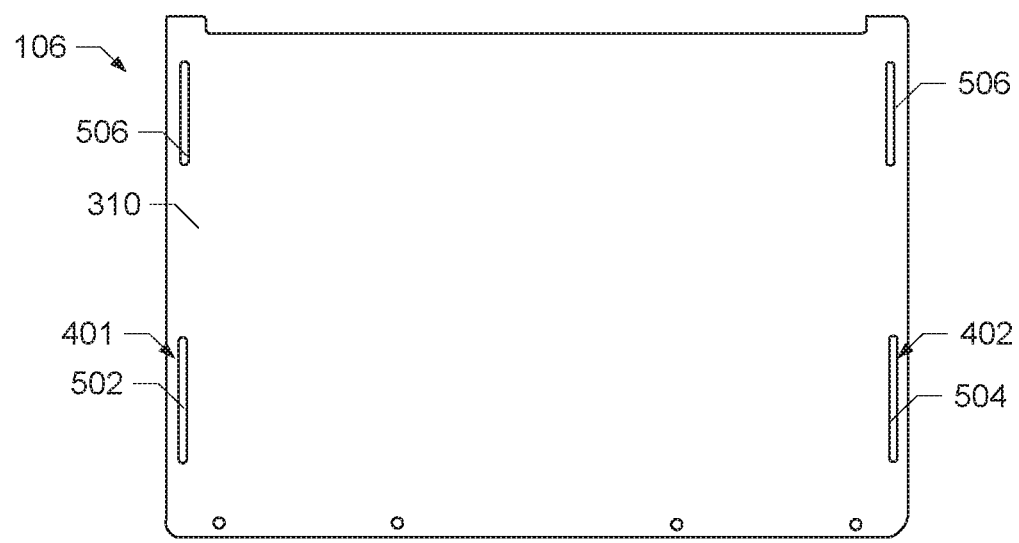
FIG. 5 is a rear view of the base of FIG. 4.

FIG. 5 illustrates a rear view of the example base 106 of FIG. 4. The first and second slot antennas 401, 402 include respective slots defined in the second surface 310 of the base 106 substantially as disclosed in connection with the second slot 320 of the example slot antenna 300 of FIG. 3A. In the example of FIG. 5, the size and shape of the slots in the second surface 310 of the base are substantially the same as the size and shape of the corresponding slots in the first surface 304 of FIG. 4. In this example, the slots in the first surface 304 and the second surface 310 of the first slot antenna 401 are substantially identical and form a pair. Also, the slots in the first surface 304 and the second surface 310 of the second slot antenna 402 are substantially identical and form a pair.

In the example of FIG. 5, the first slot antenna 401 in the second surface 310 of the base 106 is covered by a third cover 502. The second slot antenna 402 in the second surface 310 of the base 106 is covered by a fourth cover 504. The example covers 502, 504 can be coupled to the second surface 310 of the base 106 via mechanical fastener(s) and/or chemical fastener(s) or via an interference fit. In the example of FIG. 5, the covers 502, 504 include a non-conductive material (e.g., TPU) and can have substantially similar shapes and/or sizes as the covers 406, 408 of FIG. 4. In other examples, the shapes and/or sizes of the covers 502, 504 can differ from the covers 406, 408 of FIG. 4.

As disclosed herein, in some examples, the covers 502, 504 protrude from the second surface 310 of the base 106 such that the covers 502, 504 form feet of the base 106. In some examples, the second surface 310 of the base 106 includes additional feet 506 that are not associated with a slot antenna to balance the base 106 when the base 106 rests on surface such as a table. The inclusion of the additional feet 506 can be based on the number and/or placement of the slot antennas of the base 106. In other examples, the base 106 does not include the additional feet 506 (e.g., in examples where the base 106 includes four slot antennas proximate to the respective corners of the base 106 and, thus, four covers on the second surface 310 of the base 106).

In some examples, each of the slot antennas 401, 402 of FIG. 4 are substantially the same as the example slot antenna 300 of FIG. 3A. In such examples, the base 106 includes a first metal strip 322 supported by a first support 324 and proximate to the first slot antenna 401 to communicate signals to/from the first slot antenna 401. Also, in such examples, the base 106 includes a second metal strip 322 supported by a second support 324 and proximate to the second slot antenna 402 to communicate signals to/from the second slot antenna 402. In other examples, one of the covers 406, 502 of the first slot antenna 401 supports a metal strip that communicates signals to/from the first slot antenna 401 and/or one of the covers 408, 504 of the second slot antenna 402 supports a metal strip that communicates signals to/from the second slot antenna 402.

Figure 6:
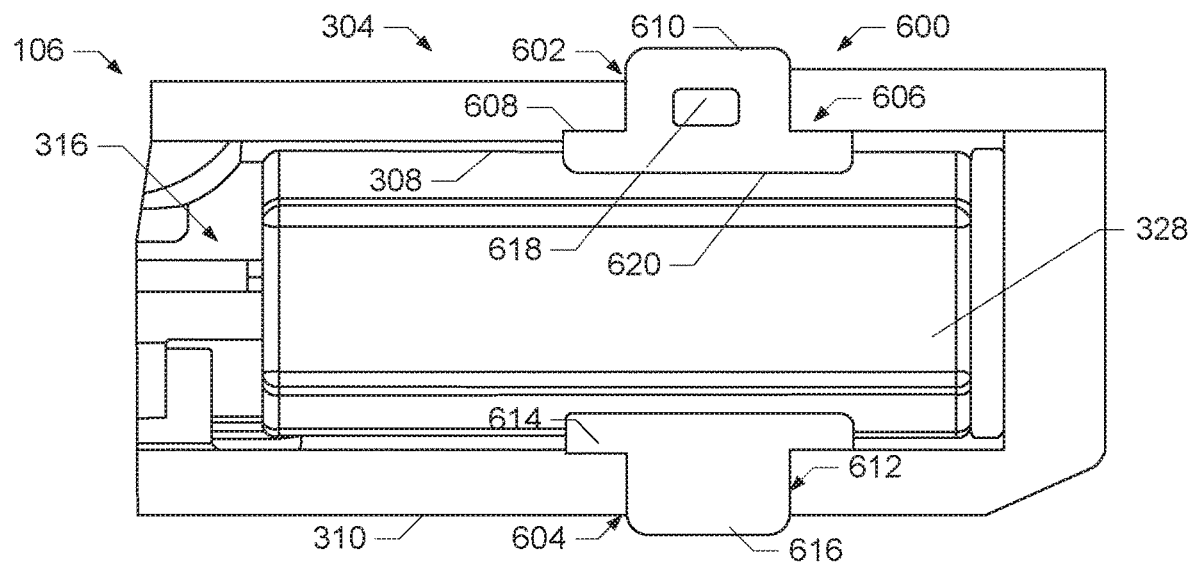
FIG. 6 illustrates a first example slot antenna that may be implemented with the example base of FIGS. 4 and 5.

FIG. 6 illustrates a first example slot antenna 600 that may be implemented with the example base 106 of FIGS. 4 and 5. For illustrative purposes, the first example slot antenna 600 is shown in FIG. 6 in a cross-sectional view of the example base 106 of FIGS. 4 and 5 taken along the A-A line of FIG. 4 corresponding to the location of the second slot antenna 402 of FIG. 4. However, the example slot antenna 600 of FIG. 6 can additionally or alternatively be located at other locations of the base 106 (e.g., corresponding to the location of the first slot antenna 401 of FIG. 4).

The slot antenna 600 of FIG. 6 includes a first slot 602 in the first surface 304 of the base 106 and a second slot 604 in the second surface 310 of the base 106 opposite and aligned with the first slot 602. In the example of FIG. 6, a first cover 606 (e.g., the second cover 408 of FIG. 4) is partially disposed in the first slot 602. As shown in FIG. 6, the first cover 606 includes a base portion 608 that is disposed in the cavity 316 of the base 106. The first cover 606 includes a protruding portion 610 that extends from the base portion 608. The example first cover 606 can be secured in the first slot 602 and the cavity 316 via an interference fit.

As shown in FIG. 6, the protruding portion 610 of the first cover 606 protrudes or projects from the first slot 602 such that the protruding portion 610 forms a raised surface relative to the first surface 304 of the base 106. The first cover 606 of this example includes a non-conductive material such as TPU or rubber. The first cover 606 of this example projects 0.5 mm above the first surface 304 of the base 106. In the example of FIG. 6, the protruding portion 610 of the first cover 606 serves as a bumper between the base 106 and the lid 104 of the user device 100 of FIG. 1. The raised surface of the first cover 606 enables the first cover 606 to serve as a spacer or a bumper between the first surface 304 of the base 106 and the lid 104 when the lid 104 is rotated toward the first surface 304 of the base 106 to close the user device (as shown in FIG. 2). When the user device is in the closed position, the first cover 606 maintains a gap between the lid 104 and the first surface 304 of the base 106 to prevent a display screen (e.g., the display screen 126 of FIG. 1) carried by the lid 104 from resting directly on the first surface 304 of the base 106.

Thus, in the example of FIG. 6, the first cover 606 serves dual purposes: the first cover 606 covers the slot 602 of the slot antenna 600 to protect the slot antenna 600 from damage and maintains a gap between the lid 104 and the base 106 when the user device 100 of FIG. 1 (e.g., a laptop) is in the closed position shown in FIG. 2. In other examples, the first cover 606 is substantially aligned (e.g., flush) with the first surface 304 of the base 106.

In the example of FIG. 6, a second cover 612 (e.g., the fourth cover 504 of FIG. 5) is partially disposed in the second slot 604. The second cover 612 of this example includes a non-conductive material such as TPU or rubber. The second cover 612 of this example includes a base portion 614 that is disposed in the cavity 316 of the base 106 and a protruding portion 616 that extends from the base portion 614. The example second cover 612 of this example is secured in the second slot 604 and the cavity 316 via an interference fit.

As shown in FIG. 6, the protruding portion 616 forms a raised surface relative to the first surface 304 of the base 106. The second cover 612 in this example protrudes 0.8 mm away from the second surface 310. The protruding portion 616 of the second cover 612 serves as a foot of the base 106 that supports the base 106 when the user device 100 of FIG. 1 rests on a surface such as tabletop. The foot formed by the second cover 612 prevents the second surface 310 of the base 106 from resting directly on the surface on which the user device rests. The second cover 612 raises the base 106 relative to the surface on which the base 106 rests to promote, for instance, airflow underneath the user device for ventilation and/or temperature control purposes. The second cover 612 also protects the surface on which the base 106 rests from damage such as scratching.

Thus, in the example of FIG. 6, the second cover 612 serves dual purposes: the second cover 612 covers the slot 604 of the slot antenna 600 to protect the slot antenna 600 from damage and serves as a foot to support the base 106. In other examples, the second cover 612 is substantially aligned (e.g., flush) with the second surface 310 of the base 106.

The example slot antenna 600 of FIG. 6 includes a conductor or metal strip 618 to communicate signals to/from the slot antenna 600 substantially as disclosed above in connection with the example metal strip 322 of FIG. 3. The metal strip 618 can include copper and/or another conductive material. The metal strip 618 is coupled to, for instance, an RF cable (e.g., the RF cable 326) that communicatively couples the slot antenna 600 to RF circuitry such as a transceiver and/or to a wireless controller of the user device 100. In the example of FIG. 6, the metal strip 618 is supported by the first cover 606. For example, during formation of the first cover 606, a non-conductive material such as TPU can be molded over at least a portion of the metal strip 618 (e.g., via an overmolding process). Thus, in the example of FIG. 6, the first cover 606 serves to support the metal strip 618 in addition to covering the first slot 602 of the slot antenna 600 and acting as bumper between the base 106 and a lid of the user device. The metal strip 618 is coupled to a cable (e.g., the cable 326 of FIGS. 3A and 3B) to communicatively couple the metal strip 618 to RF circuitry.

In other examples, the metal strip 618 of FIG. 6 is coupled to a support (e.g., the support 324 of FIGS. 3A and 3B) such as a flexible printed circuit board. The support including the metal strip 618 can be coupled to, for instance, a surface 620 of the first cover 606 disposed in the cavity 316 via a press fit and/or other means for coupling (e.g., chemical fastener(s)). As disclosed in connection with FIGS. 3A and 3B, in some examples, the support including the metal strip 618 is additionally or alternatively coupled to the second side 308 of the first surface 304 (e.g., via one or more metal sheets 330 (FIG. 3B)) to provide for grounding and/or support.

In the example of FIG. 6, component(s) of the user device 100 of FIG. 1 that are made of non-conductive material(s), such as the speaker 328 can be disposed in the cavity 316 proximate to (e.g., behind) the first slot 602 and the second slot 604 of the example slot antenna 600. Because such component(s) (e.g., the speaker 328) are made of a non-conductive material, the component(s) do not interfere with the electromagnetic fields generated by the slot antenna 600 during transmission and/or receipt of wireless signals.

Figure 7:
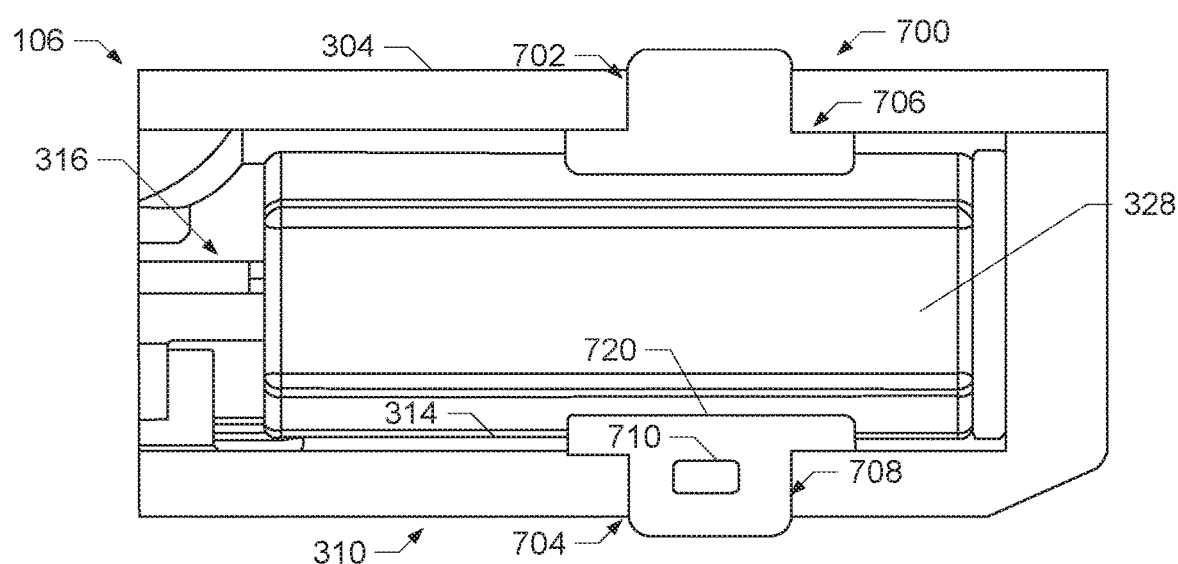
FIG. 7 illustrates a second example slot antenna that may be implemented with the example base of FIGS. 4 and 5.

FIG. 7 illustrates a second example slot antenna 700 that may be implemented with the example base 106 of FIGS. 4 and 5. For illustrative purposes, the second example slot antenna 700 is shown in FIG. 7 in a cross-sectional view of the example base 106 of FIGS. 4 and 5 taken along the A-A line of FIG. 4 and corresponding to the location of the second slot antenna 402 of FIG. 4. However, the example slot antenna 700 of FIG. 7 can additionally or alternatively be at other locations of the base 106 (e.g., corresponding to the location of the first slot antenna 401 of FIG. 4).

The example slot antenna 700 of FIG. 7 includes a first slot 702 in the first surface 304 of the base 106 and a second slot 704 in the second surface 310 of the base 106 opposite the first slot 702. A first cover 706 is partially disposed in the first slot 702 and a second cover 708 is partially disposed in the second slot 704. The covers 706, 708 can be substantially the same as the example covers 606, 612 of FIG. 6. For example, the first cover 706 can protrude from the first slot 702 to serve as a bumper between the lid 104 and the base 106 of the user device 100 of FIG. 1 as disclosed above in connection with FIG. 6. The second cover 708 can protrude from the second slot 704 to serve as a foot of the base 106 as disclosed above in connection with FIG. 7.

In the example of FIG. 7, a conductor or metal strip 710 that is used to communicate signals to/from the slot antenna 700 is supported by the second cover 708 that covers the second slot 704 in the second surface 310 of the base 106 (e.g., via an overmolding process). Thus, in this example, the second cover 708 serves to cover the second slot 704, acts as a foot for the base 106, and supports the metal strip 710 that communicates signals to/from the slot antenna 700. The metal strip 710 is coupled to a cable (e.g., the cable 326 of FIGS. 3A and 3B) to communicatively couple the metal strip 710 to RF circuitry.

In other examples, the metal strip 710 of FIG. 7 is coupled to a support (e.g., the support 324 of FIGS. 3A and 3B) such as a flexible printed circuit board. The support including the metal strip 710 can be coupled to, for instance, a surface 720 of the second cover 708 disposed in the cavity 316 via a press fit and/or other means for coupling (e.g., chemical fastener(s)). As disclosed in connection with FIGS. 3A and 3B, in some examples, the support including the metal strip 710 is additionally or alternatively coupled to the second side 314 of the second surface 310 (e.g., via one or more metal sheets 330 (FIG. 3B)) to provide for grounding and/or support.

Thus, in the examples of FIGS. 3A, 3B, 6, and 7, the metal strip 322, 618, 710 can be supported by different components of the base 106 such as the slot covers 606, 708, the speaker 328, and/or metal surfaces of the base 106. The non-conductive material(s) of the cover(s) 606, 708 and/or the speaker 328 avoid interference between the metal strip 322, 618, 710 and the slot(s) 318, 320, 602, 604, 702, 704 of the slot antennas 300, 600, 700.

Although FIGS. 3A-7 are discussed in connection with slot antenna(s) 300, 600, 700 in the base 106 of the user device 100 of FIG. 1, in other examples, the slot antenna(s) are in a lid or other housing of a user device that supports a display screen. In such examples, a bezel of the display screen may be used to cover the non-conductive material that cover the slots.

Figure 8:
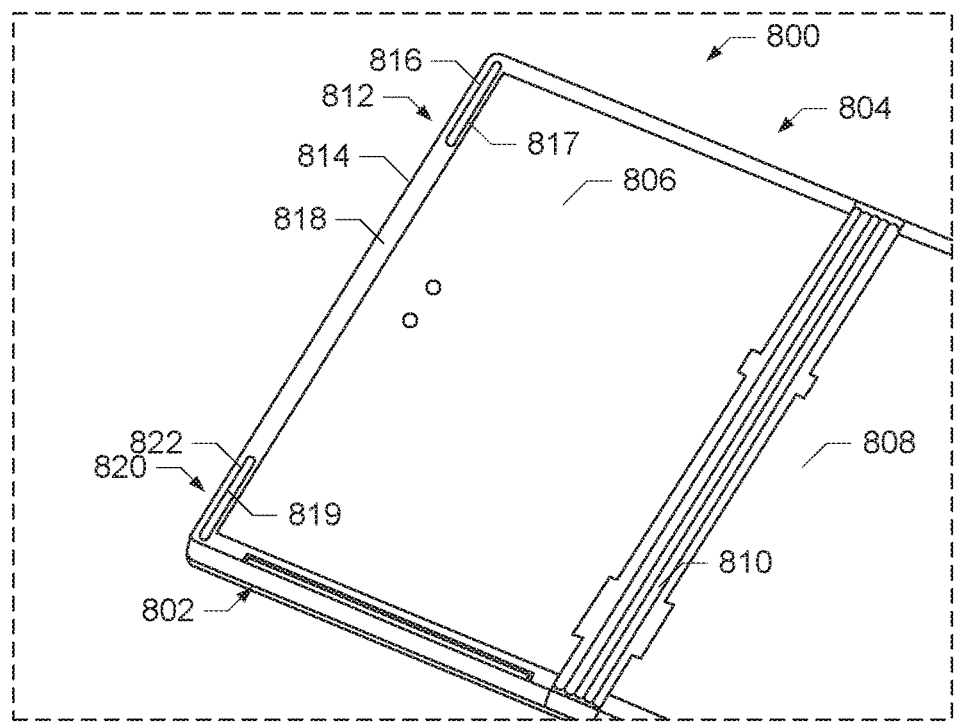
FIG. 8 is a first, partial front view of another example user device including an example slot antenna constructed in accordance with teachings disclosed herein.

FIG. 8 is a partial front view of another example user device 800 in which example slot antennas disclosed herein may be implemented. The example user device 800 of FIG. 8 is a foldable display screen device (e.g., an electronic tablet) including a metal housing 802. The metal housing 802 supports a display screen 804 having a first portion 806 and a second portion 808. The portions 806, 808 of the display screen 804 can fold about a hinge 810 of the user device 800. In other examples, the user device 800 includes a non-foldable display screen.

The example user device 800 of FIG. 8 includes a first slot antenna 812 proximate to a first edge 814 of the metal housing 802. The first slot antenna 812 includes a first slot 816 in a first surface 818 of the metal housing 802. The first slot 816 is covered by a first cover 817 including a non-conductive material (e.g., TPU, rubber). The example user device 800 includes a second slot antenna 820 spaced apart from the first slot antenna 812 along the first edge 814 of the metal housing 802. The second slot antenna 820 includes a second slot 822 in the first surface 818 of the metal housing 802. The second slot 822 is covered by a second cover 819 including a non-conductive material (e.g., TPU, rubber). In the example of FIG. 8, the covers 817, 819 are aligned with (e.g., substantially flush with) the first surface 818 of the metal housing 802 so that the covers 817, 819 are covered by a bezel of the display screen 804, as disclosed herein.

The example slot antennas 812, 820 of FIG. 8 are substantially the same as the example slot antenna 300 of FIG. 3A. For example, the metal strip 322 of FIGS. 3A and 3B coupled to the support 324 of FIGS. 3A and 3B can be disposed proximate to each of the slot antennas 812, 820 to provide means for communicating signals to/from the respective slot antennas 812, 820. The slot antennas 812, 820 can have different shapes, sizes, and/or locations than the examples shown in FIG. 8. The example user device 800 of FIG. 8 can include additional or fewer slot antennas.

Figure 9:
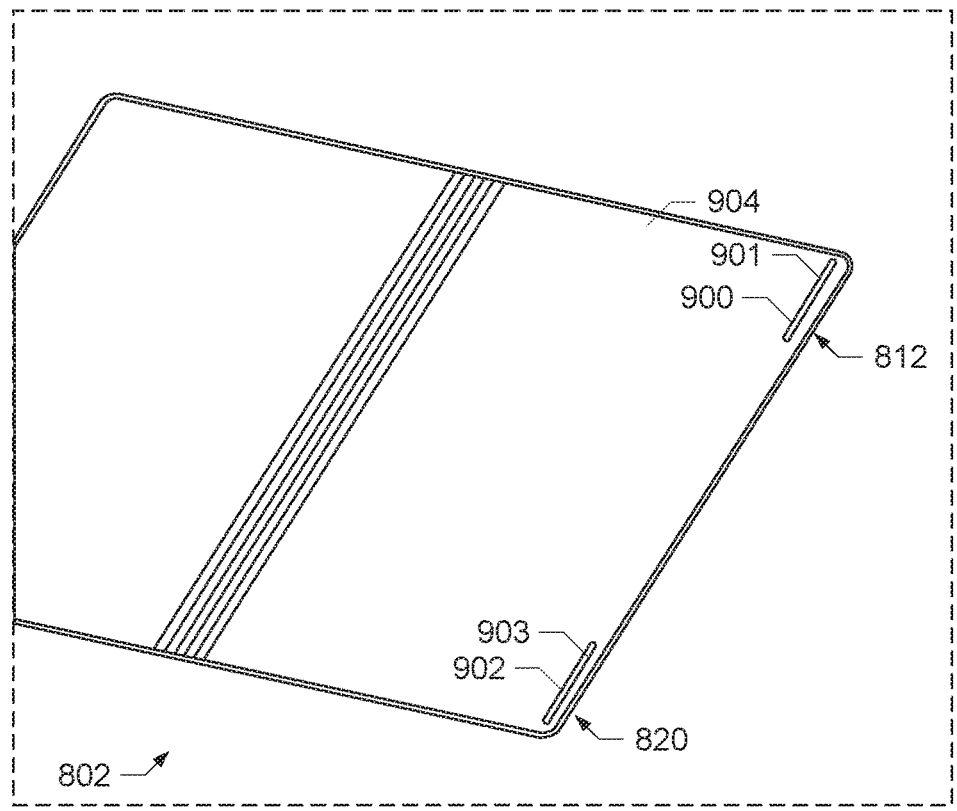
FIG. 9 is a first rear view of the example user device of FIG. 8.

FIG. 9 shows a rear view of the example user device 800 of FIG. 8 including the slot antennas 812, 820. The first slot antenna 812 includes a third slot 900 in a second surface 904 of the metal housing 802. The second surface 904 is opposite the surface 818 of the metal housing 802 that surrounds the display screen 804. The third slot 900 is opposite and aligned with the first slot 816 shown in FIG. 8. The third slot 900 is covered by a third cover 901 including a non-conductive material (e.g., TPU, rubber).

The second slot antenna 820 includes a fourth slot 902 in the second surface 904. The fourth slot 902 is opposite and aligned with the second slot 822 shown in FIG. 8. The fourth slot 902 is covered by a fourth cover 903 including a non-conductive material (e.g., TPU, rubber). In the example of FIG. 8, the covers 901, 903 are aligned with (e.g., substantially flush with) the second surface 904 of the metal housing 802 to enable the covers 901, 903 to be covered by a back cover of the user device 800, as disclosed herein.

Figure 10:
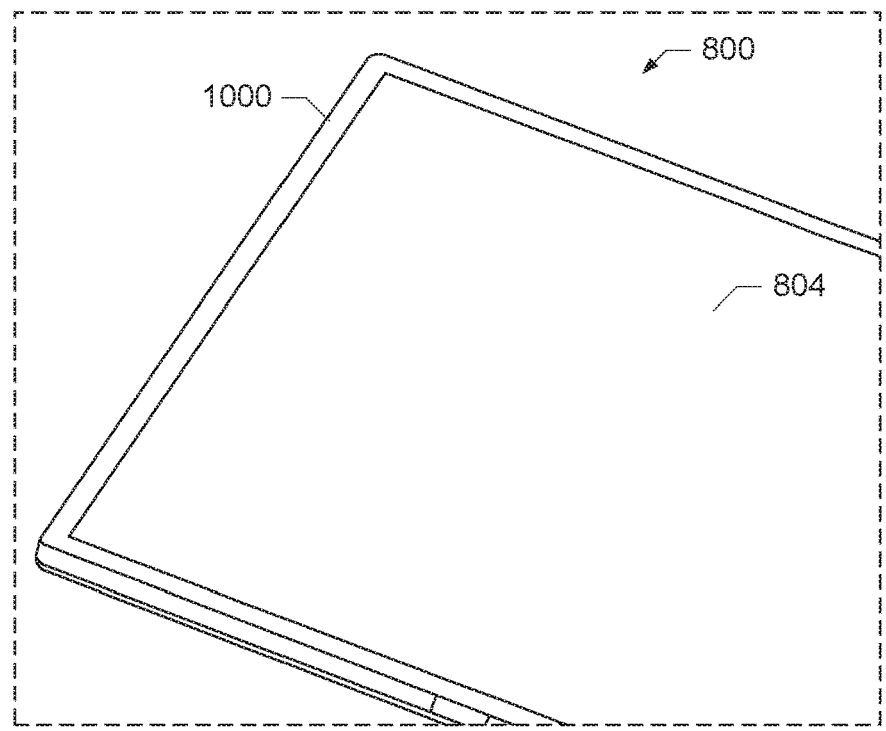
FIG. 10 is a second, partial front view of the example user device of FIG. 8.

FIG. 10 shows a front view of the example user device 800 of FIGS. 8 and 9 including an example bezel 1000 surrounding the display screen 804. The bezel 1000 can be coupled to the first surface 818 of the metal housing 802 via mechanical and/or chemical fastener(s). As shown in FIG. 10, the bezel 1000 covers the covers 817, 819 of the slot antennas 812, 820 in the first surface 818 of the metal housing 802. As a result, the slot antennas 812, 820 are not visible. The bezel 1000 of FIG. 10 includes a non-conductive material such as plastic. Thus, the bezel 1000 permits electromagnetic waves to enter and/or leave the corresponding slot antennas 812, 820 without interfering with the transmission and/or receipt of those signals by the slot antennas 812, 820.

Figure 11:
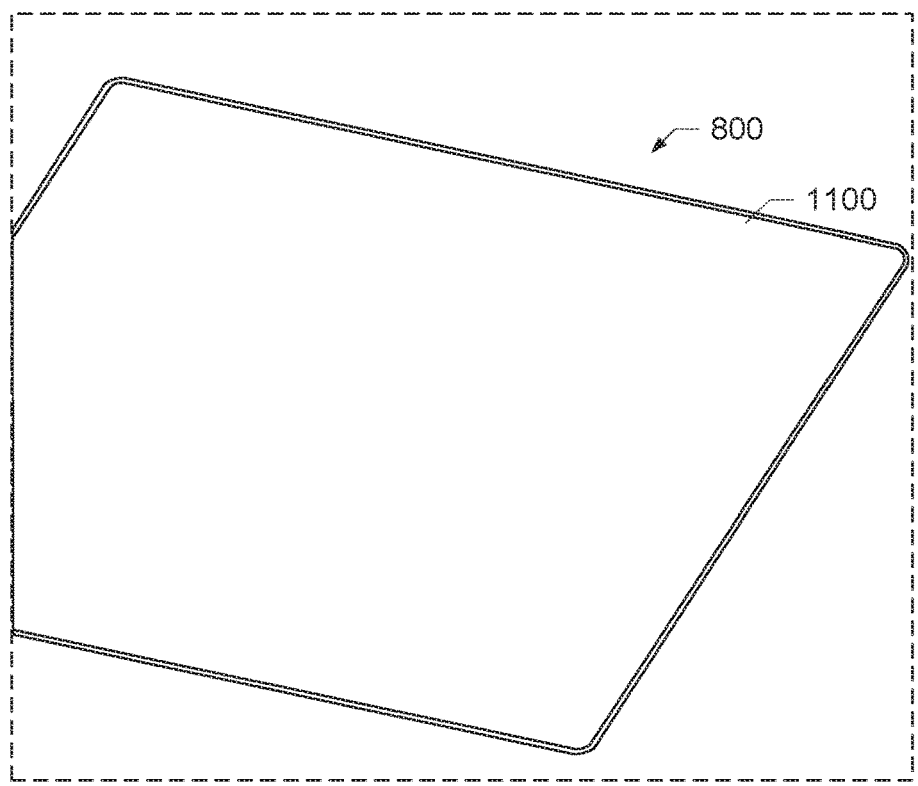
FIG. 11 is a second rear view of the example user device of FIG. 8.

FIG. 11 shows a rear view of the example user device 800 of FIGS. 8-10 including a back cover 1100 coupled to and covering the second surface 904 of the metal housing 802. The back cover 1100 can be coupled to the second surface 904 of the metal housing 802 via mechanical and/or chemical fastener(s). As shown in FIG. 11, the back cover 1100 covers the covers 901, 903 of the slot antennas 812, 820 in the second surface 904 of the metal housing 802. As a result, the slot antennas 812, 820 are not visible. The cover 1100 of FIG. 11 includes a non-conductive material such as plastic, leather, etc. Thus, the back cover 1100 permits electromagnetic waves to enter and/or leave the corresponding slot antennas 812, 820 without interfering with the transmission and/or receipt of those signals by the slot antennas 812, 820.

Figure 12:
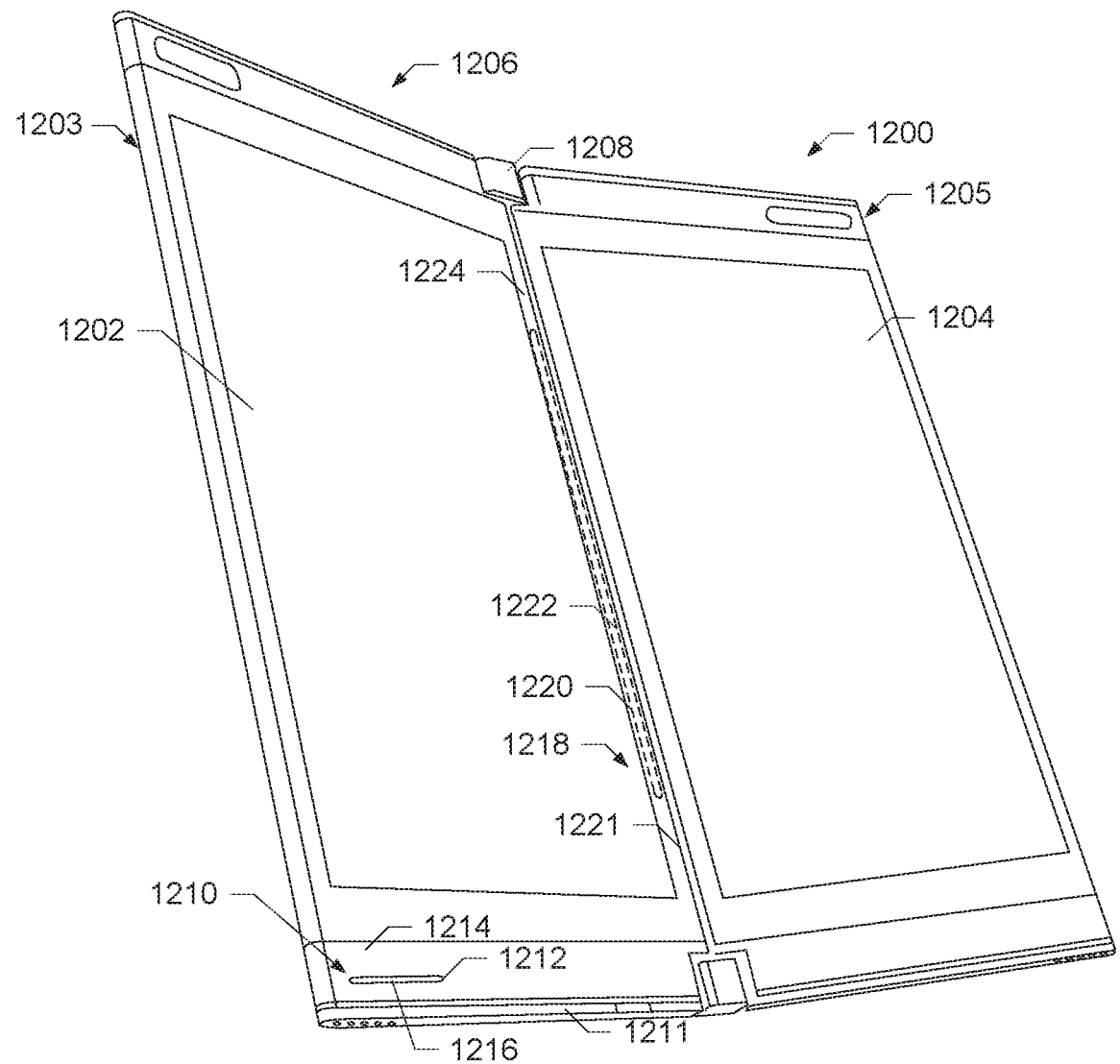
FIG. 12 illustrates an example electronic user device in an open position and including an example slot antenna constructed in accordance with teachings of this disclosure.

FIG. 12 illustrates another example user device 1200 in which example slot antennas disclosed herein may be implemented. The example user device 1200 of FIG. 8 is a dual-screen device including a first display screen 1202 supported by a first portion 1203 of a metal housing 1206 and a second display screen 1204 supported by a second portion 1205 of the metal housing 1206. In FIG. 12, the example user device 1200 is shown in an open position in which the first and second display screens 1202, 1204 are visible. The portions 1203, 1205 of the housing 1206 are foldable about a hinge 1208 of the user device 1200 to move the device 1200 to a closed position (FIG. 13) in which the display screens 1202, 1204 are not visible.

The example user device 1200 of FIG. 12 includes a first slot antenna 1210 proximate to a first edge 1211 of the metal housing 1206. The first slot antenna 1210 includes a first slot 1212 in a first surface 1214 of the metal housing 1206. The first slot 1212 is covered by a first cover 1216 including a non-conductive material (e.g., TPU, rubber). In some example the first cover 1216 protrudes relative to the first surface 1214 of the metal housing 1206 to serve as bumper between the first and second portions 1203, 1205 of the user device 1200 when the device 1200 is in the closed position (FIG. 13), substantially as disclosed in connection with FIG. 6.

The example user device 1200 includes a second slot antenna 1218 proximate to a second edge 1221 of the metal housing 1206. As shown in FIG. 12, the second edge 1221 is proximate to the hinge 1208. The second slot antenna 1218 includes a second slot 1220 in the first surface 1214 of the metal housing 1206. The second slot 1220 is covered by a second cover 1222 including a non-conductive material (e.g., TPU, rubber). In the example of FIG. 12, the cover 1222 of the second slot antenna 1218 is aligned with (e.g., substantially flush with) the first surface 1214 of the metal housing 1206 so that the cover 1222 can be covered by a bezel 1224 of the display screen 1202, as shown in FIG. 12.

The example slot antennas 1210, 1218 of FIG. 12 are substantially the same as the example slot antenna 300 of FIG. 3A. For example, the metal strip 322 of FIGS. 3A and 3B coupled to the support 324 of FIGS. 3A and 3B can be disposed proximate to each of the slot antennas 1210, 1218 to provide means for communicating signals to/from the slot antennas 1210, 1218. In other examples, the first slot antenna 1210 is substantially similar to the example slot antenna 600 of FIG. 6 in which the metal strip 618 is supported by the first cover 1216 (e.g., via an overmolding process). The slot antennas 1210, 1218 can have different shapes, sizes and/or locations than the examples shown in FIG. 12. The example user device 1200 of FIG. 12 can include additional or fewer slot antennas.

Figure 13:
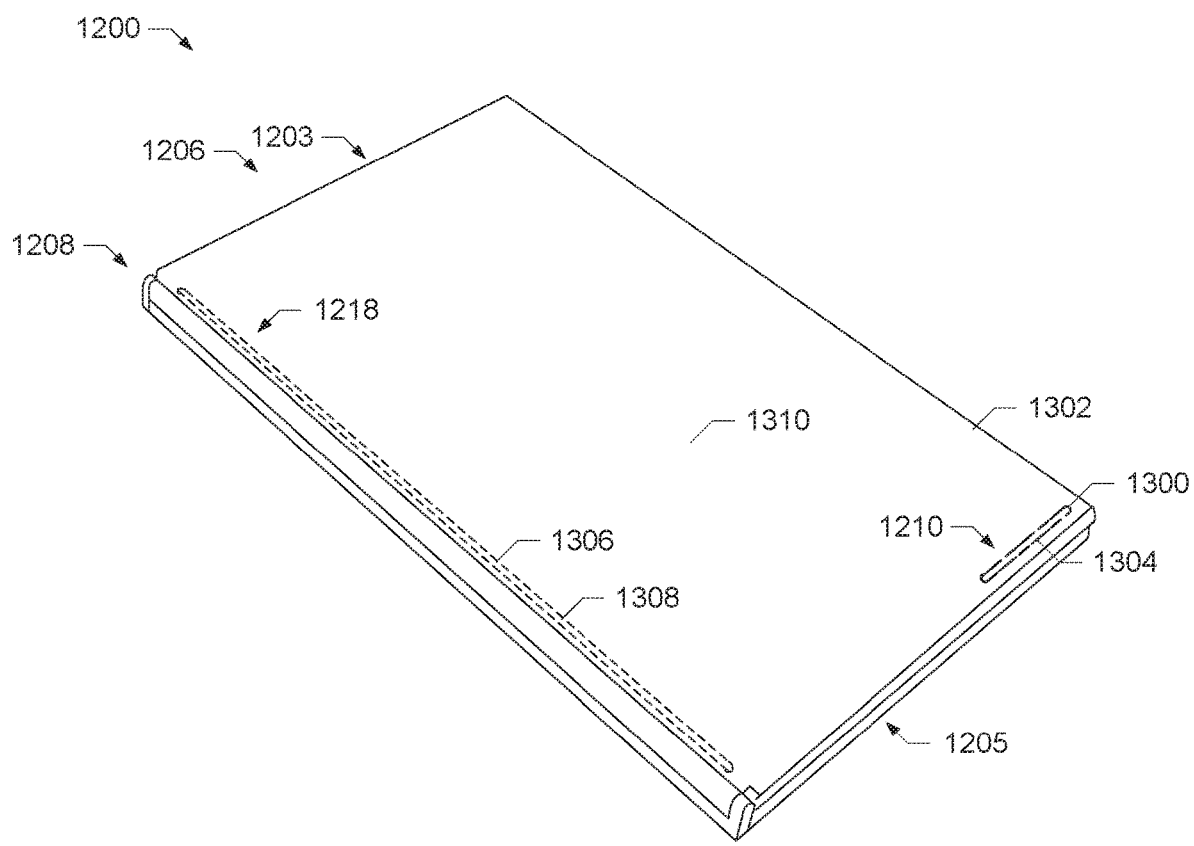
FIG. 13 illustrates the example electronic user device of FIG. 12 in a closed position.

FIG. 13 illustrates the example user device 1200 of FIG. 12 in the closed position in which the portions 1203, 1205 of the metal housing 1206 are folded about the hinge 1208 such that the display screens 1202, 1204 (FIG. 12) are not visible. The first slot antenna 1210 includes a third slot 1300 in a second surface 1302 of the metal housing 1206. The second surface 1302 is opposite the surface 1214 of the metal housing 1206 of FIG. 12. The third slot 1300 is opposite and aligned with the first slot 1212 shown in FIG. 12. The third slot 900 is covered by a third cover 1304 including a non-conductive material (e.g., TPU, rubber). The second slot antenna 1218 includes a fourth slot 1306 in the second surface 1302. The fourth slot 1306 is opposite and aligned with the second slot 1220 shown in FIG. 12. The fourth slot 1306 is covered by a fourth cover 1308 including a non-conductive material (e.g., TPU, rubber).

In the example of FIG. 13, the covers 1304, 1308 are aligned with (e.g., substantially flush with) the second surface 1302 of the metal housing 1206 to enable the covers 1304, 1308 to be covered by a back cover 1310 of the user device 1200. The back cover 1310 can be coupled to the second surface 1302 of the metal housing 1206 via mechanical and/or chemical fastener(s). As shown in FIG. 13, the back cover 1310 covers the covers 1304, 1308 of the slot antennas 1210, 1218 in the second surface 1302 of the metal housing 1206. As a result, the slot antennas 1210, 1218 are not visible. The cover 1310 of FIG. 13 includes a non-conductive material such as plastic, leather, etc. Thus, the back cover 1310 permits electromagnetic waves to enter and/or leave the corresponding slot antennas 1210, 1218 without interfering with the transmission and/or receipt of those signals by the slot antennas 1210, 1218.

In the example user devices 100, 800, 1200 of FIGS. 1-13, the use of the metal housing, such as an aluminum frame, provides a user device that is thin and flexible. The example slot antennas disclosed herein permit use of the all-metal or substantially all-metal housing without compromising performance of the slot antennas in transmitting and receiving signals due to, for instance, the use of the non-conductive covers. Also, in known devices in which the slot antennas are disposed in plastic housings, polishing the aluminum frame of the chassis and the plastic housing for the antenna to finish the chassis can be difficult and affect the finish of the chassis. Example slot antennas disclosed herein can be covered with, for instance, a display screen bezel and a back cover as disclosed in connection with the foldable devices of FIGS. 8 and 12. As a result, example user devices disclosed herein require less processing (e.g., polishing) to finish the user device during manufacturing.

Figure 14:
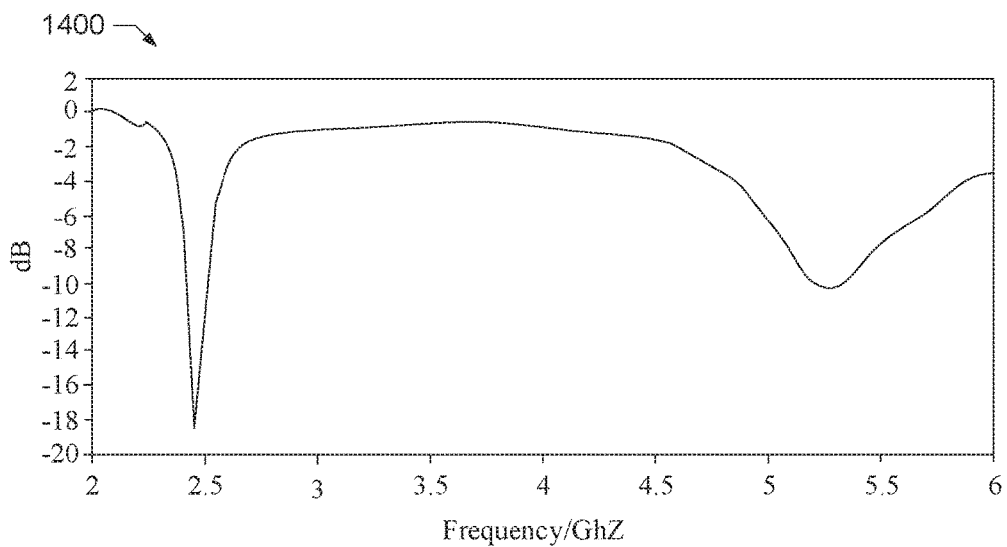
FIG. 14 is a graph illustrating an S-11 parameter of the example slot antenna of FIG. 3A.

FIG. 14 is a graph 1400 illustrating an S-11 parameter of the example slot antenna 300 of FIG. 3A. As shown in the example graph 1400 of FIG. 12, the example slot antenna 300 of FIG. 3A shows resonance at both the 2.4 GHz and the 5 GHz WLAN frequency bands.

Figures 15, 16:
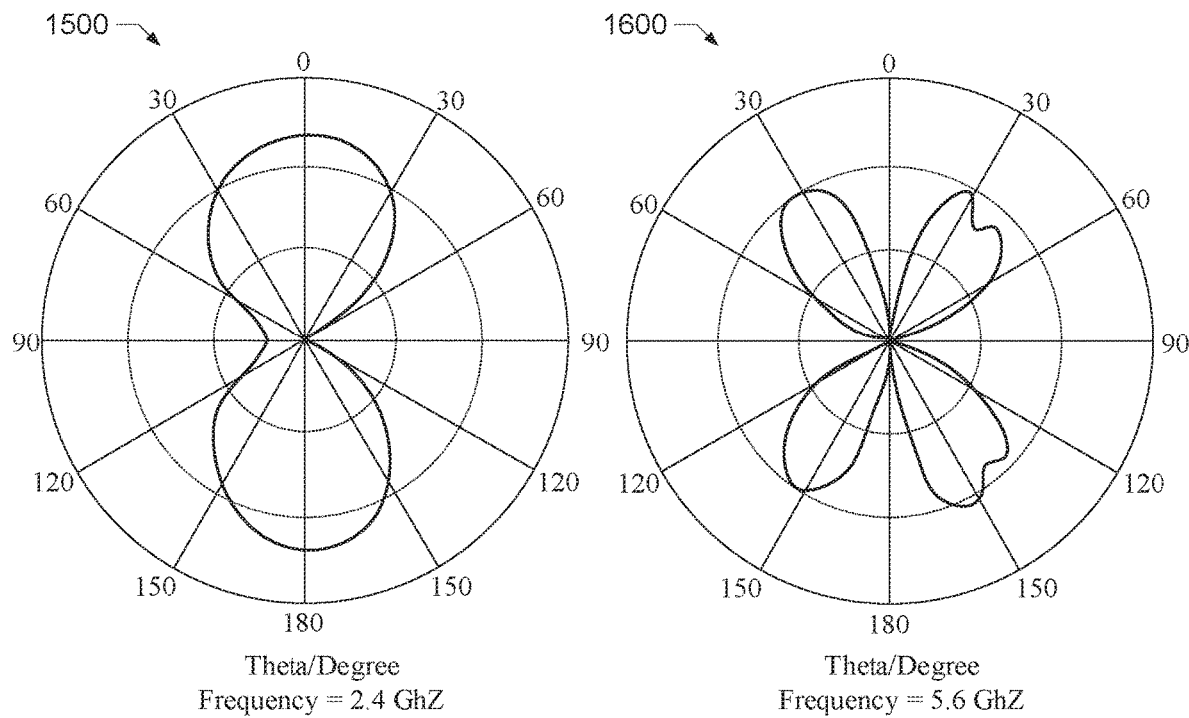
FIG. 15 illustrates an antenna radiation pattern of the example slot antenna of FIG. 3A at a first frequency.
FIG. 16 illustrates an antenna radiation pattern of the example slot antenna of FIG. 3A at a second frequency.

FIG. 15 illustrates an antenna radiation pattern 1500 of the example slot antenna 300 of FIG. 3A at 2.45 GHz. FIG. 16 illustrates an example radiation pattern 1600 of the example slot antenna 300 of FIG. 3A at 5.6 GHz. As represented by the radiation patterns 1500, 1600 of FIGS. 14 and 15, the designs of the example slot antennas disclosed herein including two slots aligned and spaced apart from one another prevent detuning of the antennas, which can otherwise affect (e.g., reduce) signal strength.

Figure 17:
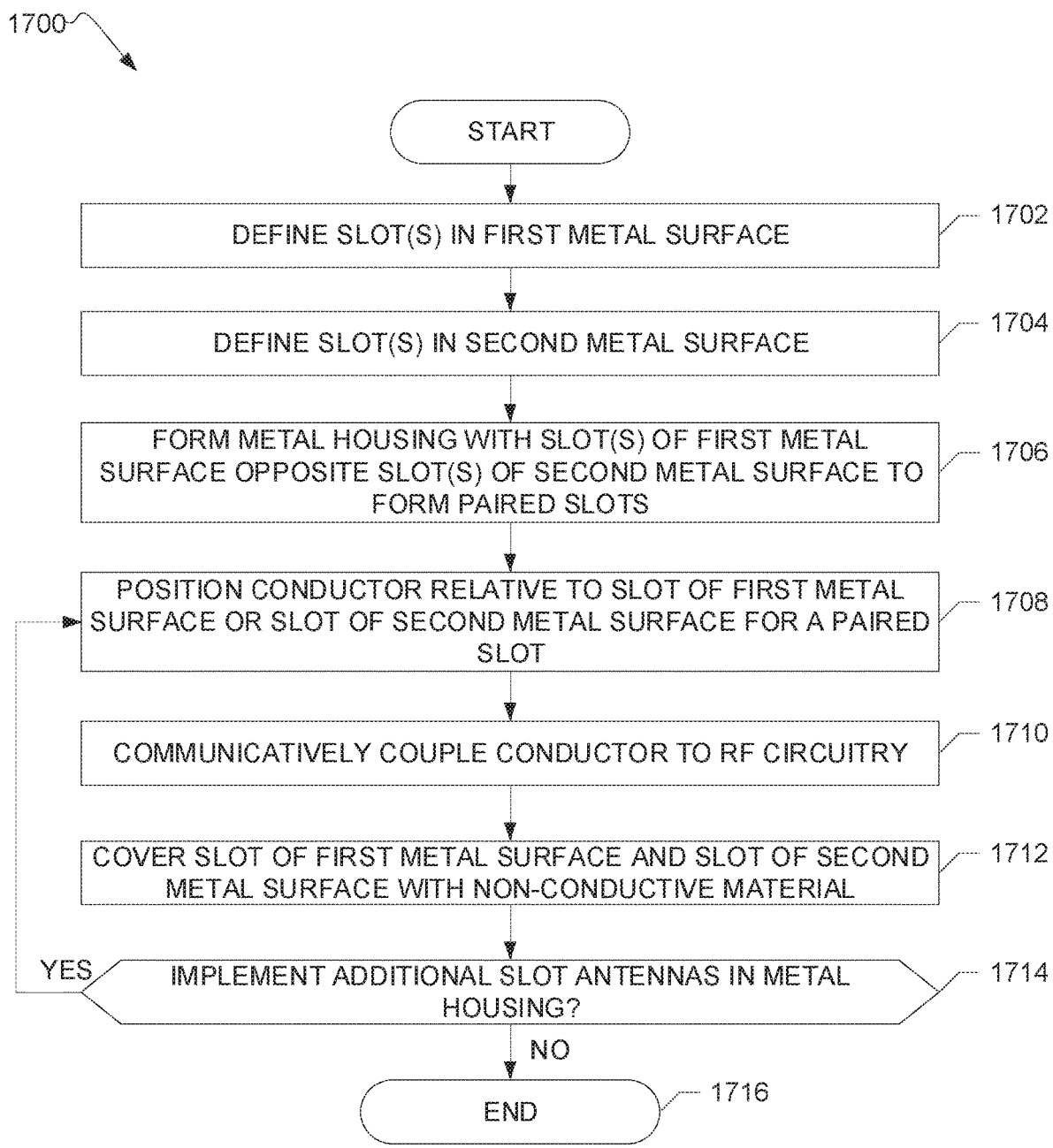
FIG. 17 is a flowchart of an example method to manufacture the example slot antennas of FIGS. 3A-13.

FIG. 17 is flowchart of an example method 1700 for manufacturing a slot antenna such as the example slot antennas 300, 401, 402, 600, 700, 812, 822, 1210, 1218 of FIGS. 3-13 in a metal chassis of an electronic user device (e.g., the user device 100, 800, 1200 of FIGS. 1, 8, 12). At block 1702, slot(s) 318, 602, 702, 816, 822, 1212, 1220 are defined in a first metal surface 304, 818, 1214. In the example method 1700, the slot(s) 318, 602, 702, 816, 822, 1212, 1220 in the first metal surface 304, 818, 1214 are formed via, for instance, extrusion, cutting, or by any other manufacturing method. At block 1704, slot(s) 320, 604, 704, 900, 902, 1300, 1306 are defined in a second metal surface 310, 904, 1302. In the example method 1700, the slot(s) 320, 604, 704, 900, 902, 1300, 1306 in the second metal surface 310, 904, 1302 are formed via, for instance, extrusion, cutting, or by any other manufacturing method.

At block 1706, a metal housing 106, 802, 1206 is formed from the first metal surface 304, 818, 1214 and the second metal surface 310, 904, 1302. The first metal surface 304, 818, 1214 is aligned with the second metal surface 310, 904, 1302 such that respective ones of the slots(s) 318, 602, 702, 816, 822, 1212, 1220 of the first metal surface 304, 818, 1214 are opposite and aligned with corresponding respective ones of the slot(s) 320, 604, 704, 900, 902, 1300, 1306 of the second metal surface 310, 904, 1302. As a result, respective ones of the slots(s) 318, 602, 702, 816, 822, 1212, 1220 in the first metal surface 304, 818, 1214 and corresponding respective ones of the slot(s) 320, 604, 704, 900, 902, 1300, 1306 of the second metal surface 310, 904, 1302 form pairs. The first metal surface 304, 818, 1214 and the second metal surface 310, 904, 1302 can be coupled to one another to form the housing 106, 802, 1206 via mechanical fastener(s) and/or chemical fastener(s).

At block 1708, for one of the slot pairs, a conductor or metal strip 322, 618, 710 is positioned relative to the slot 318, 602, 702, 816, 822, 1212, 1220 of the first metal surface 304, 818, 1214 or the slot 320, 604, 704, 900, 902, 1300, 1306 of the second metal surface 310, 904, 1302. The metal strip 322, 618, 710 conveys electromagnetic waves at least one of to or away from the slot antennas 300, 401, 402, 600, 700, 812, 822, 1210, 1218. In some examples, the metal strip 322, 618, 710 is coupled to a support 324 (e.g., a printed circuit board, a flexible printed circuit). In such examples, the support 324 can be coupled to one of the first metal surface 304, 818, 1214 or second metal surface 310, 904, 1302 via mechanical fastener(s) or chemical fastener(s) to position the metal strip 322, 618, 710 proximate to the slot 318, 602, 702, 816, 822, 1212, 1220 of the first metal surface 304, 818, 1214 or the slot 320, 604, 704, 900, 902, 1300, 1306 of the second metal surface 310, 904, 1302. In other examples, the support 324 including the metal strip 322, 618, 710 is positioned on a non-conductive component of the user device, such as a speaker 328 disposed in the metal housing 106, 802, 1206 between the slot 318, 602, 702, 816, 822, 1212, 1220 of the first metal surface 304, 818, 1214 and the corresponding slot 320, 604, 704, 900, 902, 1300, 1306 of the second metal surface 310, 904, 1302. In some examples, the support 324 including the metal strip 322, 618, 710 is at least partially coupled to the a non-conductive cover 406, 408, 502, 504, 606, 612, 706, 708, 817, 819, 901, 903, 1216, 1222 used to cover the slot(s) 318, 320, 602, 604, 702, 704, 816, 822, 900, 902, 1212, 1220, 1300, 1306 via a press fit and/or other means for coupling (e.g., chemical fastener(s)). In other examples, the metal strip 322, 618, 710 is supported by a non-conductive cover 406, 408, 502, 504, 606, 612, 706, 708, 817, 819, 901, 903, 1216, 1222 used to cover the slot(s) 318, 320, 602, 604, 702, 704, 816, 822, 900, 902, 1212, 1220, 1300, 1306 via an overmolding process.

At block 1710, the metal strip 322, 618, 710 is communicatively coupled to RF circuitry via, for instance, the cable 326, to enable the metal strip 322, 618, 710 to communicate signals to/from the slot antennas 300, 401, 402, 600, 700, 812, 822, 1210, 1218 to the RF circuitry.

At block 1712, the slot 318, 602, 702, 816, 822, 1212, 1220 of the first metal surface 304, 818, 1214 and the slot 320, 604, 704, 900, 902, 1300, 1306 of the second metal surface 310, 904, 1302 are covered with a non-conductive material, such as TPU or rubber (i.e., if not already covered via the positioning of a metal strip 322, 618, 710 that is supported by a non-conductive cover 406, 408, 502, 504, 606, 612, 706, 708, 817, 819, 901, 903, 1216, 1222). The non-conductive cover(s) 406, 408, 502, 504, 606, 612, 706, 708, 817, 819, 901, 903, 1216, 1222 can be coupled to the slots 318, 320, 602, 604, 702, 704, 816, 822, 900, 902, 1212, 1220, 1300, 1306 via mechanical fastener(s) and/or chemical fastener(s) and/or held in place via an interference fit.

The example method 1700 of FIG. 17 ends when no further slot antennas are to be implemented in the metal housing 106, 802 of the user device (blocks 1714, 1716).

Although the example method 1700 of FIG. 17 is described in reference to the flowchart illustrated in FIG. 17, many other methods of manufacturing the example slot antennas of FIGS. 3-13 may alternatively be used. For example, the order of execution of the blocks may be changed, and/or some of the blocks described may be changed, eliminated, or combined. Similarly, additional operations may be included in the manufacturing process before, in between, or after the blocks shown in FIG. 17.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

From the foregoing, it will be appreciated that example methods, apparatus, and articles of manufacture have been disclosed that provide slot antenna(s) in a metal chassis of an electronic user device. Example slot antenna(s) disclosed herein include a first slot in a first surface of the metal chassis and a second slot in a second surface of the metal chassis, where in the second slot is opposite and aligned with the first slot. A metal strip is disposed proximate to one of the slots to communicate signals to/from the slot antenna. Example slot antenna(s) disclosed herein include non-conductive covers that provide multiple functions, including covering the slots, serving as feet or bumpers for the user device, and/or supporting the metal strip that communicates signals to/from the slot antenna. Example slot antenna(s) disclosed herein facilitate use of a metal chassis without compromising performance of the slot antenna(s) in transmitting and receiving signals and without using non-conductive materials in lieu of metal for the chassis of the user device.

Example methods, apparatus, systems, and articles of manufacture to implement slot antennas for electronic user devices are disclosed herein. Further examples and combinations thereof include the following:

Example 1 includes an example electronic user device including at least one of a lid or a base. The at least one of the lid or the base have a first surface and a second surface spaced apart from the second surface. The example electronic user device includes an antenna including a first aperture in the first surface and a second aperture in the second surface. The example user device includes a first cover at least partially disposed in the first aperture and a second cover at least partially disposed in the second aperture.

Example 2 includes the electronic user device as defined in example 1, wherein the first cover protrudes from the first aperture to define a gap between the base and the lid when the lid is rotated toward the base.

Example 3 includes the electronic user device as defined in examples 1 or 2, wherein at least one of the first surface or the second surface includes a metallic material.

Example 4 includes the electronic user device as defined in any of examples 1-3, further including a metal strip disposed proximate to the antenna.

Example 5 includes the electronic user device as defined in example 4, wherein the metal strip is carried by one of the first cover or the second cover.

Example 6 includes the electronic user device as defined in examples 1 or 2, wherein the second cover protrudes from the second aperture, the second cover to define a foot of the base.

Example 7 includes the electronic user device as defined in example 1, wherein the base defines a cavity therein and further including a speaker disposed in the cavity between the first aperture and the second aperture.

Example 8 includes the electronic user device as defined in examples 1 or 2, wherein the first cover includes thermoplastic urethane.

Example 9 includes an apparatus including a housing including a first surface and a second surface opposite the first surface, the first surface and the second surface including a metallic material; a display screen supported by the housing; and an antenna proximate to the display screen, the antenna including a first aperture in the first surface; and a second aperture in the second surface opposite the first aperture. The example apparatus includes means for communicating signals communicatively coupled to the antenna.

Example 10 includes the apparatus as defined in example 9, further including a first cover to cover the first aperture, the first cover including a non-conductive material.

Example 11 includes the apparatus as defined in example 10, further including a bezel disposed about the display screen, the bezel to cover the first cover.

Example 12 includes the apparatus as defined in example 10, further including a second cover to cover the second aperture, the second cover including a non-conductive material.

Example 13 includes the apparatus as defined in example 12, further including a third cover coupled to the second surface, the third cover to cover the second cover.

Example 14 includes the apparatus as defined in example 9, wherein the means for communicating signals includes a metal strip.

Example 15 includes the apparatus as defined in example 14, wherein the metal strip is coupled to a printed circuit board, the printed circuit board coupled to one of the first surface or the second surface.

Example 16 includes an electronic user device including a housing including a first metal surface and a second metal surface spaced apart from and opposite the second metal surface, a first aperture defined in the first metal surface, a second aperture defined in the second metal surface opposite the first aperture, the first aperture and the second aperture to implement a slot antenna, and a conductor in proximity to the slot antenna to convey electromagnetic waves at least one of to or away from the slot antenna.

Example 17 includes the electronic user device as defined in example 16, wherein the slot antenna is a dual-band frequency antenna.

Example 18 includes the electronic user device as defined in examples 16 or 17, further including a display screen, the first metal surface and the second metal surface to support the display screen.

Example 19 includes the electronic user device as defined in examples 16 or 17, further including a keyboard, the first metal surface and the second metal surface define a base, the base to support the keyboard.

Example 20 includes the electronic user device as defined in examples 16 or 17, further including a first cover to cover the first aperture and a second cover to cover the second aperture.

Example 21 includes a method including defining a first aperture in a first metal surface of a chassis of an electronic user device, defining a second aperture in a second metal surface of the chassis, the second metal surface spaced apart from and opposite the first metal surface, positioning a conductor proximate to one of the first aperture or the second aperture, and covering the first aperture with a first cover and the second aperture with a second cover.

Example 22 includes the method as defined in example 21, wherein the covering of the first aperture includes at least partially disposing the first cover in the first aperture.

Example 23 includes the method as defined in example 21, wherein operatively coupling the conductor to the one of the first aperture or the second aperture includes coupling a support for the conductor to one of the first metal surface or the second metal surface.

Example 24 includes the method as defined in example 21, wherein the first metal surface and the second metal surface define a base of the electronic user device.

Example 25 includes the method as defined in example 21, wherein the first metal surface and the second metal surface define a housing to support a display screen of the electronic user device.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An electronic user device comprising:
    a lid;
    a base, at least one of the lid or the base having a first surface and a second surface spaced apart from the first surface, the first surface including a first aperture, the second surface including a second aperture;
    an antenna defined by the first aperture and the second aperture;
    a first cover at least partially in the first aperture, the first cover to protrude from the first aperture to define a gap between the base and the lid when the lid is rotated toward the base; and
    a second cover at least partially in the second aperture.

2. The electronic user device as defined in claim 1, wherein at least one of the first surface or the second surface includes a metallic material.

3. The electronic user device as defined in claim 1, further including a metal strip proximate to the antenna.

4. An electronic user device comprising:
    at least one of a lid or a base, the at least one of the lid or the base having a first surface and a second surface spaced apart from the first surface, the first surface including a first aperture, the second surface including a second aperture, the first aperture and the second aperture to implement an antenna;
    a first cover at least partially in the first aperture;
    a second cover at least partially in the second aperture; and
    a metal strip proximate to the antenna, the metal strip carried by one of the first cover or the second cover.

5. The electronic user device as defined in claim 4, wherein the first cover includes thermoplastic urethane.

6. An electronic user device comprising:
    a base having a first surface and a second surface spaced apart from the first surface, the first surface including a first aperture, the second surface including a second aperture, the first aperture and the second aperture to implement an antenna;
    a first cover at least partially in the first aperture; and
    a second cover at least partially in the second aperture, the second cover to protrude from the second aperture, the second cover to define a foot of the base.

7. An electronic user device comprising:
a base having a first surface and a second surface spaced apart from the first surface, the first surface including a first aperture, the second surface including a second aperture, the first aperture and the second aperture to implement an antenna, the base defining a cavity therein;
a first cover at least partially in the first aperture;
a second cover at least partially in the second aperture; and
a speaker in the cavity between the first aperture and the second aperture.

8. An apparatus comprising:
a housing including a first surface and a second surface opposite the first surface, the first surface and the second surface including a metallic material, the first surface including a first aperture, the second surface including a second aperture opposite the first aperture;
a display screen supported by the housing;
an antenna proximate to the display screen, the antenna defined by the first aperture and the second aperture;
means for communicating signals communicatively coupled to the antenna;
a first cover to cover the first aperture, the first cover including a non-conductive material; and
a bezel about the display screen, the bezel to cover the first cover.

9. An apparatus comprising:
a housing including a first surface and a second surface opposite the first surface, the first surface and the second surface including a metallic material, the first surface including a first aperture, the second surface including a second aperture opposite the first aperture;
a display screen supported by the housing;
an antenna proximate to the display screen, the antenna defined by the first aperture and the second aperture;
means for communicating signals communicatively coupled to the antenna;
a first cover to cover the first aperture, the first cover including a non-conductive material;
a second cover to cover the second aperture, the second cover including a non-conductive material; and
a third cover coupled to the second surface, the third cover to cover the second cover.

10. The apparatus as defined in claim 9, wherein the means for communicating signals includes a metal strip.

11. An apparatus comprising:
a housing including a first surface and a second surface opposite the first surface, the first surface and the second surface including a metallic material, the first surface including a first aperture, the second surface including a second aperture opposite the first aperture;
a display screen supported by the housing;
an antenna proximate to the display screen, the antenna defined by the first aperture and the second aperture; and
means for communicating signals communicatively coupled to the antenna, the means for communicating including a metal strip, the metal strip coupled to a printed circuit board, the printed circuit board coupled to one of the first surface or the second surface.

12. An electronic user device comprising:
a housing including a first metal surface and a second metal surface spaced apart from and opposite the first metal surface;
a first aperture defined in the first metal surface;
a second aperture defined in the second metal surface opposite the first aperture, the first aperture and the second aperture to implement a slot antenna, the slot antenna being a dual-band frequency antenna; and
a conductor in proximity to the slot antenna to convey electromagnetic waves at least one of to or away from the slot antenna.

13. The electronic user device as defined in claim 12, further including a display screen, the first metal surface and the second metal surface to support the display screen.

14. The electronic user device as defined in claim 12, further including a first cover to cover the first aperture and a second cover to cover the second aperture.

15. An electronic user device comprising:
a housing including a first metal surface and a second metal surface spaced apart from and opposite the first metal surface;
a first aperture defined in the first metal surface;
a second aperture defined in the second metal surface opposite the first aperture, the first aperture and the second aperture to implement a slot antenna;
a conductor in proximity to the slot antenna to convey electromagnetic waves at least one of to or away from the slot antenna; and
a keyboard, the first metal surface and the second metal surface to define a base, the base to support the keyboard.

16. A method comprising:
defining a first aperture in a first metal surface of a chassis of an electronic user device;
defining a second aperture in a second metal surface of the chassis, the second metal surface spaced apart from and opposite the first metal surface;
positioning a conductor proximate to one of the first aperture or the second aperture;
coupling a support for the conductor to one of the first metal surface or the second metal surface; and
covering the first aperture with a first cover and the second aperture with a second cover.

17. The method as defined in claim 16, wherein the covering of the first aperture includes at least partially positioning the first cover in the first aperture.

18. The method as defined in claim 16, wherein the first metal surface and the second metal surface define a base of the electronic user device.

19. The method as defined in claim 16, wherein the first metal surface and the second metal surface define a housing to support a display screen of the electronic user device.

* * * * *